US007983155B2

(12) United States Patent
Zaniolo et al.

(10) Patent No.: US 7,983,155 B2
(45) Date of Patent: Jul. 19, 2011

(54) SYSTEMS AND METHODS FOR TESTING A NETWORK

(75) Inventors: Luiz Cesar Zaniolo, Boca Raton, FL (US); Francisco Olympio Marcon da Rocha, Boca Raton, FL (US); Robinson Osmar Lima, Boca Raton, FL (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 708 days.

(21) Appl. No.: 11/063,629

(22) Filed: Feb. 23, 2005

(65) Prior Publication Data

US 2006/0187848 A1    Aug. 24, 2006

(51) Int. Cl.
*H04J 1/16*      (2006.01)
*H04J 3/14*      (2006.01)
*H04L 12/26*     (2006.01)
(52) U.S. Cl. .................. 370/229; 370/241; 370/252
(58) Field of Classification Search .................. 370/229, 370/241, 252
See application file for complete search history.

(56) References Cited

U.S. PATENT DOCUMENTS

| | | | |
|---|---|---|---|
| 6,625,648 B1 * | 9/2003 | Schwaller et al. | 709/224 |
| 7,046,636 B1 * | 5/2006 | Shaffer et al. | 370/252 |
| 7,173,910 B2 * | 2/2007 | Goodman | 370/252 |
| 2003/0091032 A1 * | 5/2003 | Laxman et al. | 370/352 |
| 2003/0137944 A1 * | 7/2003 | Medvinsky | 370/252 |
| 2004/0062204 A1 * | 4/2004 | Bearden et al. | 370/250 |
| 2005/0149787 A1 * | 7/2005 | Choi et al. | 714/724 |
| 2005/0286494 A1 * | 12/2005 | Hollatz et al. | 370/352 |

OTHER PUBLICATIONS

SPIRENT Communications, Voice Over IP (VoIP), 2001, P/N 340-1158-001 REV A, Aug. 2001, pp. 1-45.*

* cited by examiner

*Primary Examiner* — Chirag G Shah
*Assistant Examiner* — Srinivasa R Reddivalam

(57) ABSTRACT

Devices, systems and methods that generate and test network traffic are disclosed. The exemplary method may include transmitting one or more requests to generate network testing traffic to one or more endpoints, generating network testing traffic from one or more endpoints, and collecting network testing traffic data. Additional aspects of the method may also include transmitting one or more requests to receive network testing traffic to one or more endpoints and receiving network testing traffic by one or more endpoints that received the request to receive network traffic. The devices, systems and methods may provide additional security measures, operational controls and other aspects as discussed later herein.

19 Claims, 5 Drawing Sheets

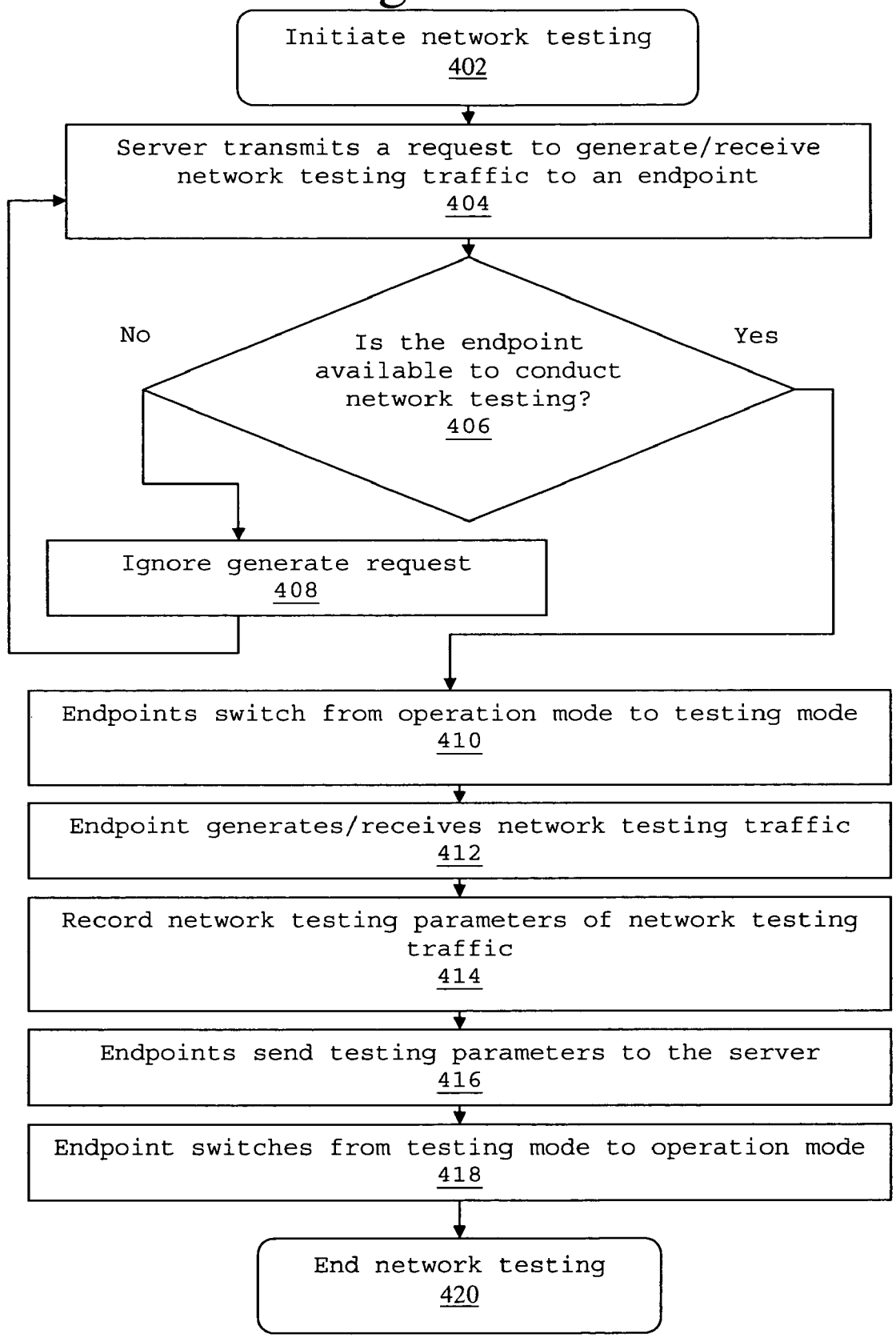

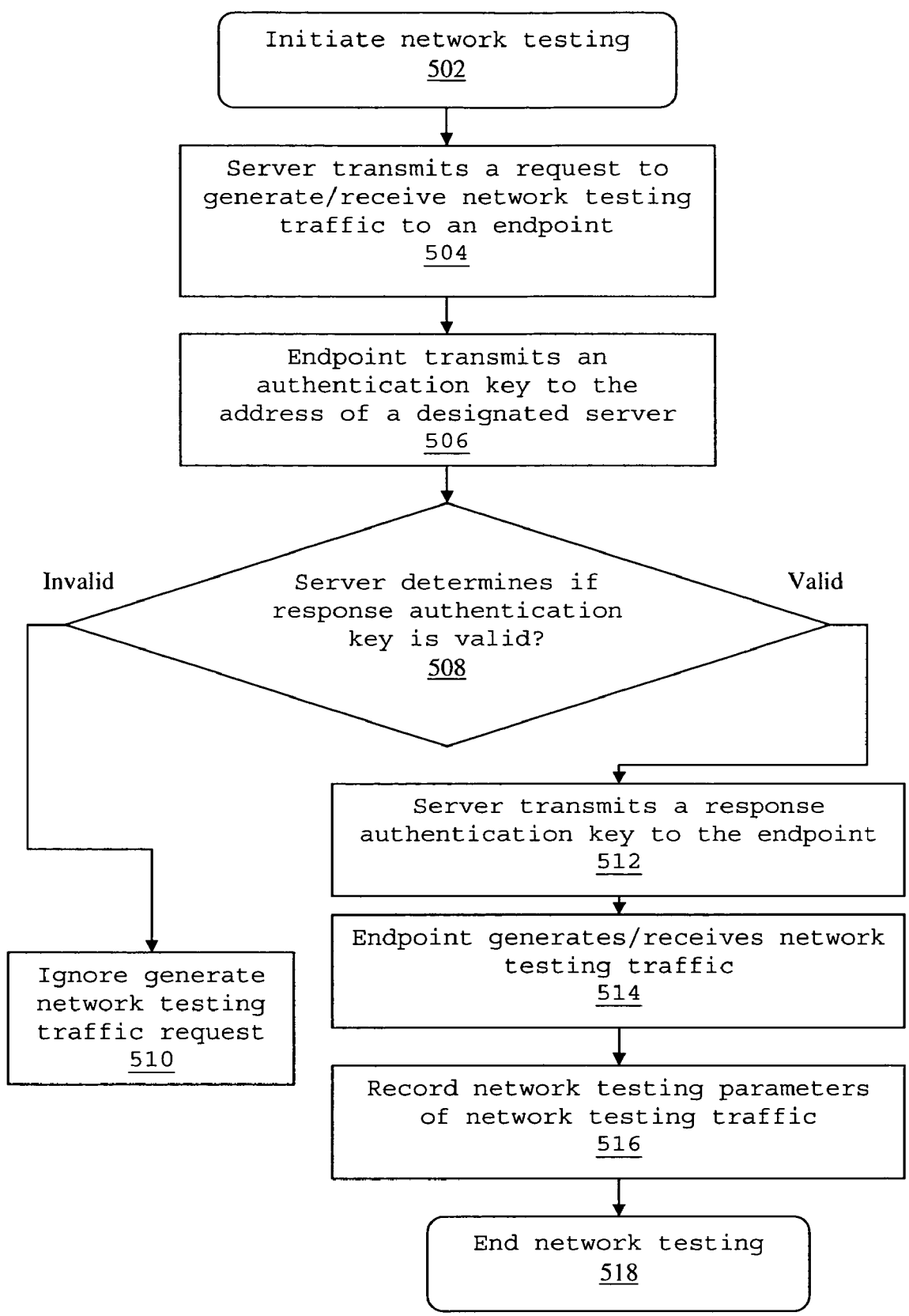

SYSTEMS AND METHODS FOR TESTING A NETWORK

FIELD OF THE INVENTION

The present invention relates generally to testing of a network, and more particularly to utilizing endpoints to generate network traffic for testing purposes.

BACKGROUND OF THE INVENTION

Telephone networks can work on a variety of platforms and transmit information using a variety of protocols. A telephone network, for example, can send voice information with a traditional circuit-based protocol on a Public Switched Telephone Network (PSTN) or it can send voice information in discrete digital packets using an internet protocol termed "Voice over IP" (VoIP).

As VoIP has becomes more widely used, the line between traditional telephony and computer systems has become less defined. Many companies now use their local area networks (LANs) to transmit telephone signals between users on the network. The computer networks may be local area networks such as those contained within a single building, campus area networks, which may extend between several buildings, or may be a global or wide area network such as the Internet. One benefit of using a VoIP system to transmit telephone signals is the savings associated with not having to install and maintain a separate telephone system.

A general VoIP system may include two or more endpoints and a server. The endpoints allow a user to receive and transmit digital packets associated with audio signals of the user. The server helps direct and coordinate transmitting the digital packets to their correct endpoint. The server may also track network parameters to avoid network congestion and optimize use of network components.

In a network using Session Initiated Protocol (SIP), the server may measure a parameter based on the reception of calls generated based on an amount of generated traffic. Since the server's physical location may prevent the server from generating call attempts that realistically model endpoints generating the calls, the network administrator may use a SIP call generator. The SIP call generator may be connected to the network during testing. The SIP call generator sends and receives SIP calls producing network testing traffic and measuring network testing traffic data. The network testing traffic data is analyzed to determine points of congestion in the network and load capacity of the network. The network testing traffic produced by the SIP call generator may not realistically model the actual traffic of the network. Since the network testing traffic is generated from a single physical point on the network (the physical location of the call generator) the network testing traffic may not realistically simulate actual network traffic. In addition, the call generators may need to be redistributed to different physical points on the network to model additional network traffic conditions.

Accordingly, an efficient and effective method is needed for generating and testing network traffic conditions. In view of the foregoing, it is desirable to provide a system that can generate network testing traffic that realistically models actual network traffic. It is also desirable to provide a system that may be efficiently implemented and modified to model a variety of network testing traffic conditions.

SUMMARY OF THE INVENTION

It is, therefore, an objective of the present invention to provide devices, systems, and methods that use endpoints to generate and receive network traffic for network testing purposes. It may also be desirable to ensure that the system collects network testing data and works with network security.

According to an exemplary preferred embodiment of the present invention, a method may include transmitting one or more requests to generate network testing traffic to one or more endpoints, generating network testing traffic from one or more endpoints receiving the request to generate network testing traffic, and collecting network testing traffic data. In an additional aspect of the invention, the method may also include transmitting one or more requests to receive network testing traffic to one or more endpoints and receiving network testing traffic by one or more endpoints receiving the request to receive network testing traffic.

In one exemplary embodiment, the network testing traffic may be used to analyze busy hours call attempts (BHCA). In another exemplary embodiment, the endpoints may collect network testing traffic data. In another exemplary embodiment the method may transmit an authentication key from one or more endpoints to a server transmitting requests to generate network testing traffic. The server may transmit a response authentication key to the one or more endpoints. In another exemplary embodiment, the network may use Session Initiated Protocol (SIP). The testing may involve measuring the processing capacities of a server of the network. In another embodiment, the one or more endpoints may switch to a testing mode when the request is received by the endpoint. The one or more endpoints may also switch to an operating mode when the generated network testing traffic is complete. The above embodiments may also be incorporated in a device or system for network testing.

BRIEF DESCRIPTION OF THE DRAWINGS

The above and other objectives and advantages of the present invention will be apparent upon consideration of the following detailed description, taken in conjunction with the accompanying drawings, in which like reference numbers refer to like parts throughout, and in which:

FIG. 4 is a flow chart illustrating a third exemplary embodiment of the present invention.

FIG. 5 is a flow chart illustrating a fourth exemplary embodiment of the present invention.

DETAILED DESCRIPTION OF THE INVENTION

Figure 1:
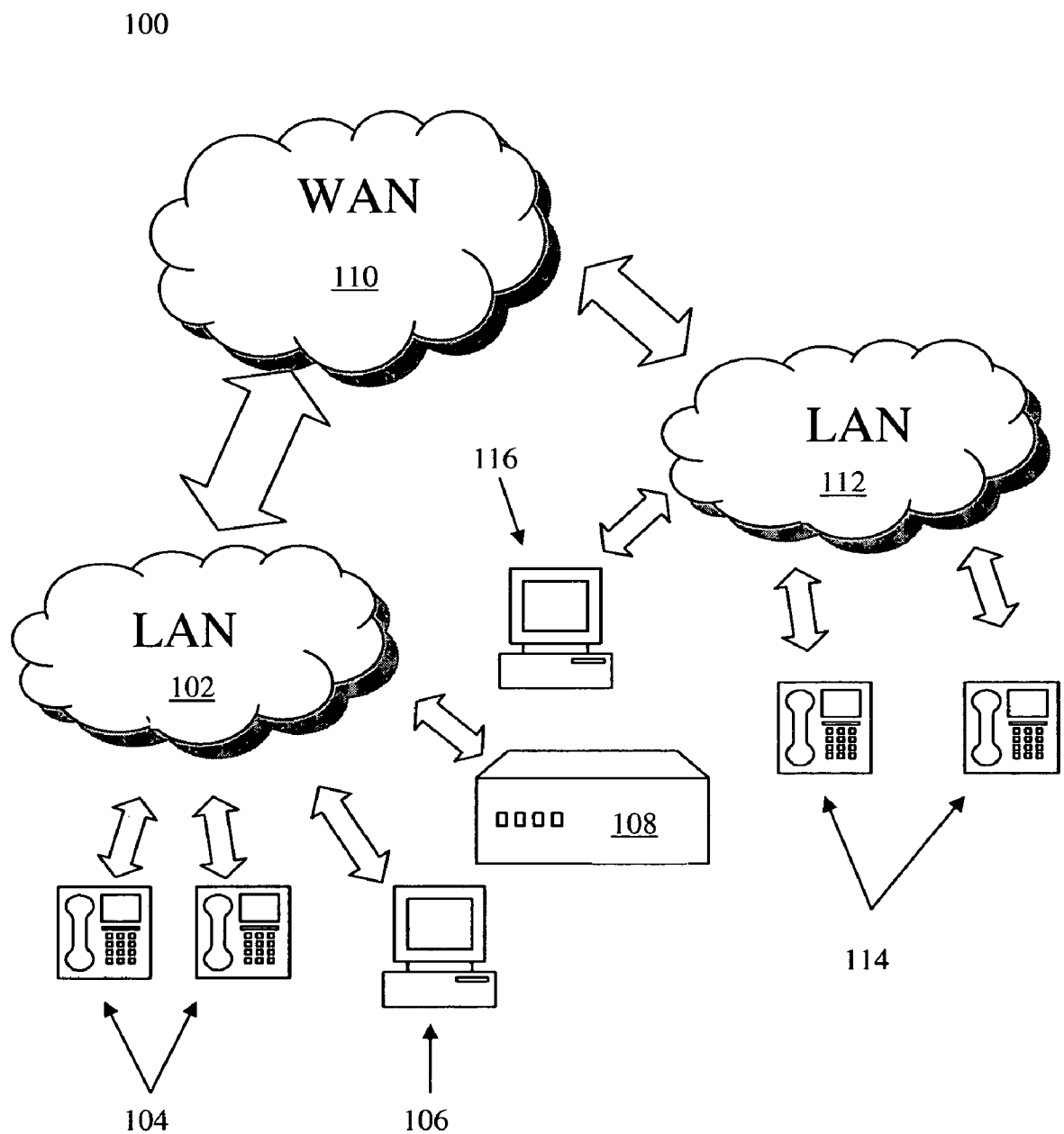
FIG. 1 shows a generalized schematic of an exemplary communications network used to implement a preferred embodiment of the present invention.

FIG. 1 is a generalized schematic of an exemplary telephone communications network 100 that may be used to implement preferred embodiments of the present invention. The communications network 100 connects various communication devices through a Local Area Network (LAN) 102. The LAN 102 may include a variety of endpoint devices 104 to allow a user to transmit and receive telephone signals. Examples of these endpoints may include the OptiPoint® family of VoIP telephones manufactured by Siemens or any other suitable platforms. These phones may include memory and processing ability along with other hardware to transmit and receive audio signals.

LAN 102 may also include additional equipment, for example, routers, hubs, workstations 106, and servers 108. The server 108 and workstation 106 may be used to manage the communications received, transmitted, and managed by the LAN 102. These additional components can also reformat and transmit the information using multiple protocols prior to delivering the information to the final destination. The digital packets can be transmitted across Wide Area Networks (WAN) 110 to other LANs 112 with similar endpoints 114 and workstations 116.

Server 108 and workstations 106 can also be used to test parameters of the network and analyze operation of the system. During operation of the network, endpoints 104 and equipment of the network can become congested and prevent reception of new calls. As previously discussed herein, a network using Session Initiated Protocol (SIP), server 108 may measure the reception of calls received based on an amount of generated traffic.

To generate network traffic and to simulate actual network traffic, the invention may request endpoints 104 to generate and receive network testing traffic. Server 108 sends a request to endpoints 104 of the network to transmit or receive network testing traffic as will be discussed later herein. The network testing traffic data is then analyzed. The request to transmit or receive network traffic also may include additional parameters, for example, the destination of the call attempts, the frequency of calls attempts, and the period of time to generate or receive network testing traffic.

Based on the data collected during network testing traffic, the Busy Hours Call Attempts (BHCA) for the network can be calculated. The desired load of the network in BHCA can be set with the variation of the parameters: frequency of calls and number of endpoints. For example, the network administrator may intend to load the network with 5000 BHCA. The server can send requests to 100 endpoints to generate/receive network testing traffic (50 as "call generators" and 50 as "call receptors"), requesting 100 calls per hour (1 call attempt every 36 seconds). The BHCA is equal to (the number of endpoints in the test/2)*(frequency of calls). In the example above, the BHCA equals (100/2)*100 calls per hour=5000.

The following examples show the variation in testing parameters as a result of a change in the BHCA. In the first example, an average time of 1.2 seconds between call attempts and a BHCA of 7500 results in a 0.0001% of call attempts not received over call attempts generated. In a second example, keeping the frequency of call attempts the same and changing the BHCA to 8500 results in 0.001% of call attempts not received over call attempts generated. In a third example, an average time of 4.3 seconds between call attempts and a BHCA of 9500 results in a 0.068% of call attempts not received over call attempts generated. In a fourth example, an average time of 4.6 seconds between call attempts and a BHCA of 8500 results in a 7.635% of call attempts not received over call attempts generated. Based on the third and fourth examples it is possible to see that with BHCA=8500 the network is heavily overloaded and with BHCA=9500 the quality drops dramatically.

In addition to changing the amount of network testing traffic, the server can also request other endpoints generate/receive network testing traffic. This allows the system to test different physical points on the network. The system can be used to more accurately simulate actual network traffic. The system is also not limited to a telephone communications network as discussed above in the exemplary communications network. The invention may be implemented in a variety of networks including but not limited to video and other data networks. The invention is also not limited to testing parameters associated with the BHCA. The system can be used to test a variety of network conditions and parameters.

Figure 2:
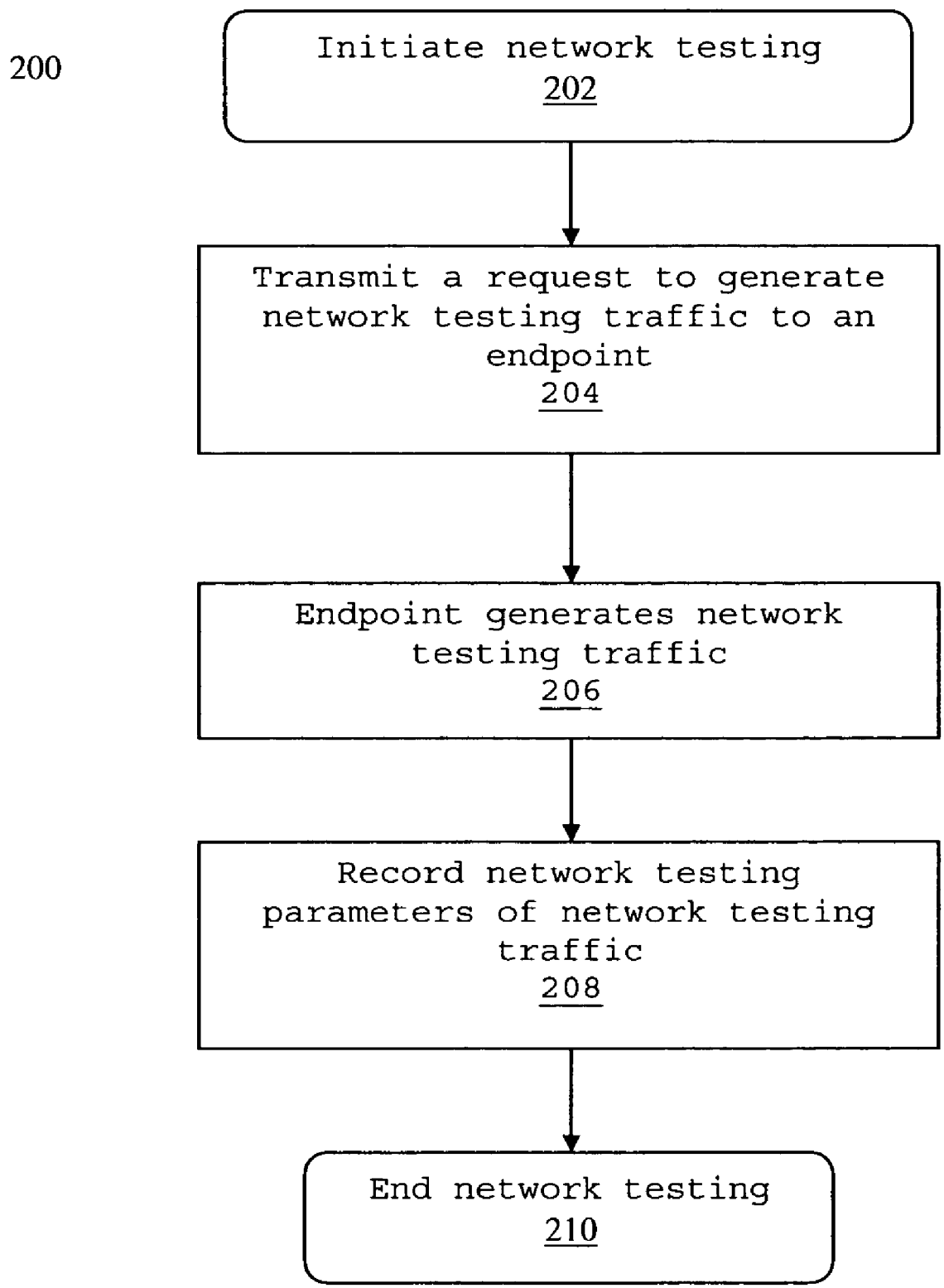
FIG. 2 is a flow chart illustrating a first exemplary embodiment of the present invention.

FIG. 2 is a flow chart illustrating a first exemplary embodiment 200 of the present invention. According to the first exemplary embodiment 200, a network administrator initiates the network testing (block 202). The network administrator may enter parameters of the network testing traffic into the server or other administrator access point of the system. For example, the administrator may enter the frequency of calls, the amount of time for the network testing, and/or the endpoints to generate or receive network testing traffic.

According to the first exemplary embodiment, the server then transmits a request to generate network testing traffic to the endpoint designated by the administrator (block 204). Each endpoint that received the request generates network testing traffic (block 206). In the exemplary SIP telephone network, the network testing traffic may be initiating calls to other endpoints, servers, or other testing points on the network. The system records parameters of the network testing traffic (block 208). In the exemplary SIP telephone network, the parameters may be recording the number of calls received by the intended endpoint. The recording of network testing parameters may be done by a variety of devices on the network. For example, the endpoint generating the testing traffic, the endpoint receiving the testing traffic, or the server may be used to collect the testing data. The testing data can be analyzed by the system and the network testing is completed (block 210).

Figure 3:
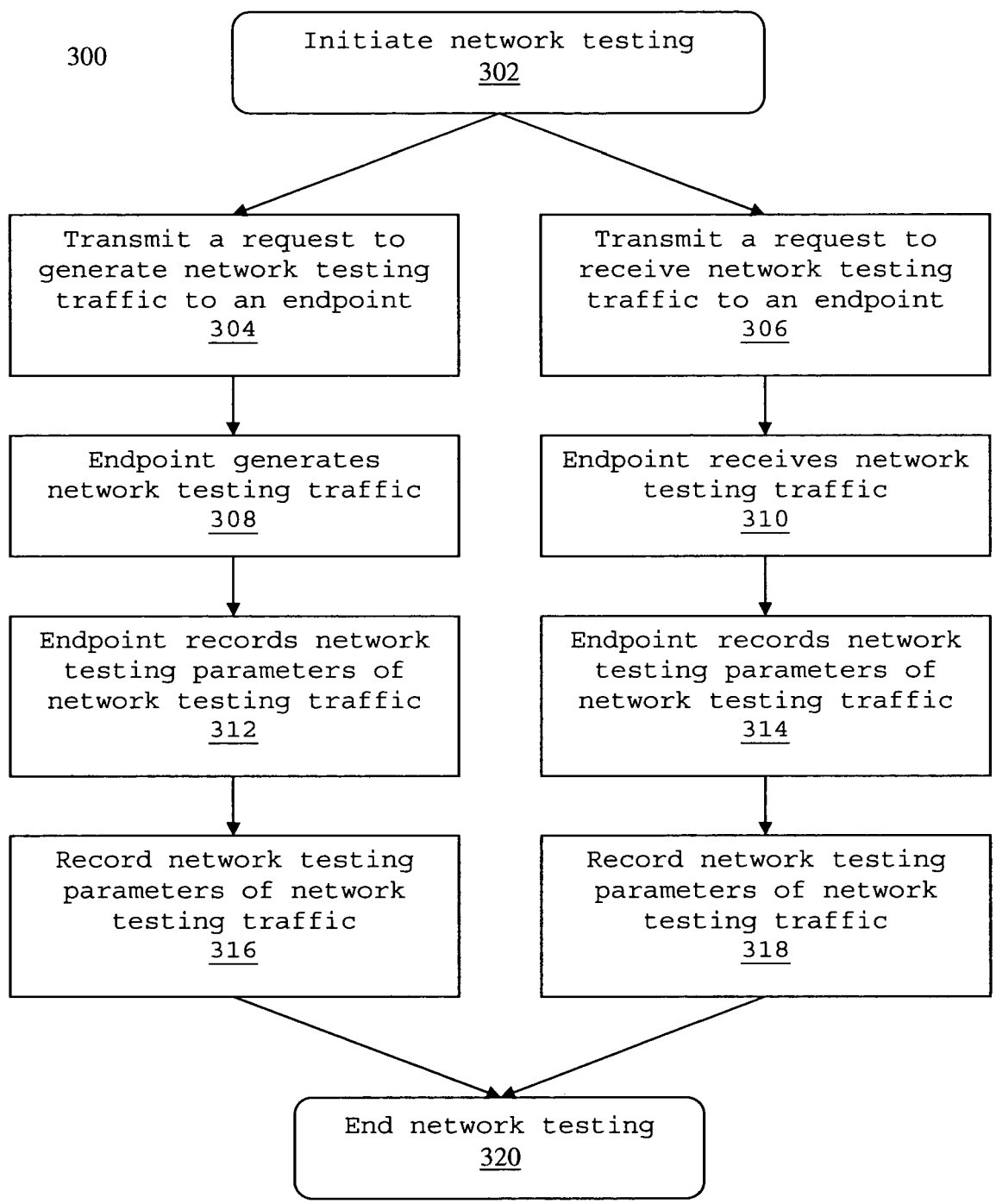
FIG. 3 is a flow chart illustrating a second exemplary embodiment of the present invention.

FIG. 3 is a flow chart illustrating a second exemplary embodiment 300 of the present invention. According to the second exemplary embodiment 300, a network administrator initiates the network testing (block 302). Initiating the network testing of the second exemplary embodiment is similar to initiating the network testing traffic as described in the first exemplary embodiment. However, according to the second exemplary embodiment, in addition to selecting the endpoints to generate network traffic, endpoints are also designated to receive network testing traffic.

According to the second exemplary embodiment, the server then transmits a request to generate network testing traffic to the endpoints designated for generating traffic (block 304). The server also transmits a request to receive network testing traffic to the endpoints designated for receiving traffic (block 306). Each endpoint that received the request to generate testing traffic, generates traffic to the endpoints designated to receive traffic (block 308). Each endpoint that received the request to receive traffic begins to receive testing traffic from the endpoints designated to generate testing traffic (block 310).

In the exemplary SIP telephone network, the network testing traffic may be accomplished by initiating calls to the endpoints that have been designated to receive testing traffic. The system records parameters of the network testing traffic. In the exemplary SIP telephone network, the designated endpoints generating testing traffic may record the number of call attempts generated (block 312) and the endpoints designated to receive testing traffic may record the call attempts successfully received (block 314). The testing data may be transferred to the network server from the endpoints designated to generate testing traffic (block 316) and from the endpoints designated to receive testing traffic (block 318). The testing data can be analyzed by the system and the network testing is completed (block 320).

FIG. 4 is a flow chart illustrating a third exemplary embodiment 400 of the present invention. According to the third exemplary embodiment 400, the system initiates the network testing (block 402). The system may load parameters of the network testing traffic into the server or other access point of the system. For example, the system may load the frequency of calls, the amount of time for the network testing, and/or the endpoints to generate and/or receive network testing traffic.

According to the third exemplary embodiment, the server then transmits requests to the endpoints designated to generate or receive network testing traffic (block 404). Each endpoint that received the request to generate or receive network testing traffic determines if the endpoint is available to perform the test (block 406). For example, the endpoint receiving a request may signal a user of the endpoint of the impending testing. The user may still be at work and may instruct the endpoint to deny use of the endpoint for testing ("No" branch). The endpoint may ignore the request to generate or receive testing traffic (block 408). The server may then identify another endpoint and send an additional request to replace the unavailable endpoint or may postpone network testing.

If the endpoint is available, for example, if the user has left work and is not using the endpoint, the endpoint will be available to the system for network testing ("Yes" branch). The endpoint switches from normal operation mode to testing mode (block 410). The endpoints generate or receive network testing traffic based on the request received by the endpoint (block 412). The endpoints record parameters of the network testing (block 414). The recorded parameters are sent from the endpoints that record the data to a server for analysis (block 416). The endpoints have completed testing and switch from testing mode back to operation mode (block 418). The testing data can be analyzed by the system and the network testing is completed (block 420).

FIG. 5 is a flow chart illustrating a fourth exemplary embodiment 500 of the present invention. According to the fourth exemplary embodiment 500, the system provides additional security aspects to prevent security attacks from illegitimate network testing requests. The system may initiate the network testing (block 502) in a similar fashion as described in previous exemplary embodiments. The server transmits requests to the endpoints designated to generate or receive network testing traffic (block 504).

According to the fourth exemplary embodiment, each endpoint that received the request to generate or receive network testing traffic may transmit an authentication key to the address of a server that has been previously programmed into the endpoint (block 506). The server then determines if the response authentication key is valid (block 508). If the response authentication key is invalid ("Invalid" branch), the server may not respond to the endpoint resulting in the endpoint ignoring the request (block 510). For example, if an illegitimate server requested to start a test, the endpoint may send the authentication key to the pre-programmed address of a server (inside a known legitimate network). The designated server knows that it has not requested the test to start. The server may alternatively send a message to the endpoint blocking the test. The server may also generate a report of the potential attack blocked.

If the server receives the authentication key for a test it has requested or knows is authorized ("Valid" branch), the server may transmit a response authentication key to the endpoint (block 512). The endpoint then generates or receives network testing traffic based on the request received by the endpoint (block 514). The endpoints record parameters of the network testing and may send data to the server for analysis (block 516). The testing data can be analyzed by the system and the network testing is completed (block 518).

Architecturally, aspects of the invention can be located on a server, workstation, minicomputer, mainframe, or any other suitable platform. Aspects of the invention may also be located on an endpoint device of the network, for example a primary telephone of the network may be configured to perform the methods associated with the invention.

A general purpose computer, in terms of hardware architecture, includes a processor, memory, and one or more input and/or output (I/O) devices (or peripherals) that are communicatively coupled via a local interface. The local interface can be, for example, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connections to enable appropriate communications among the components of a network. The systems and methods may be hardwired or wirelessly connected with the computer or other suitable device to perform various aspects of the invention.

The systems and methods may also be incorporated in software used with a computer or other suitable operating device. The software stored or loaded in the memory may include one or more separate programs, each of which comprises an ordered listing of executable instructions for implementing the methods and systems of the invention. The software may work in conjunction with an operating system. The operating system essentially controls the execution of the computer programs, such as the software stored within the memory, and provides scheduling, input-output control, file and data management, memory management, and communication control and related services.

The system and method may also include a Graphic User Interface (GUI) to allow the network administrator to enter constraints associated with the network testing traffic or parameters of the network to be tested. The GUI may provide a user-friendly interface which allows the network administrator to select from different testing conditions. For example, the network administrator may select the endpoints to generate calls. The system may then direct the administrator to enter the endpoints to receive the generated call attempts. In another example, the administrator may select a BHCA. The system will then prompt the user to select a call attempt frequency. Based on the call attempt frequency and BHCA, the system will determine the number of endpoints to generate calls and the number of endpoints to receive calls. The GUI can also provide the results of tested parameters of the network testing traffic in a variety of formats. The system can provide graphs or charts relating the parameters to prior tests or various different testing conditions.

Thus, systems and methods generate network traffic to simulate actual network traffic and may provide an adjustable model to test a variety of network testing conditions. It will be understood that the foregoing is only illustrative of the principles of the invention and that various modifications can be made by those skilled in the art without departing from the scope and spirit of the invention. Accordingly, such embodiments will be recognized as within the scope of the present invention.

Persons skilled in the art will appreciate that the present invention can be practiced by other than the described embodiments, which are presented for purposes of illustration rather than of limitation and that the present invention is limited only by the claims that follow.

What is claimed is:
1. A method for testing a network comprising:
transmitting a plurality of requests to a plurality of endpoints distributed over a network to generate network testing traffic, wherein said plurality of requests are transmitted to generate network testing traffic at a selected load level for the network and wherein the plurality of requests each specify one of the plurality of endpoints generating network testing traffic at a set frequency for a set period of time, said frequency being at least fifty per hour;

generating Voice over Internet Protocol (VoIP) messages from each of the plurality of endpoints responsive to the plurality of requests, generated VoIP messages from the plurality of endpoints being network testing traffic and loading the network with VoIP messages from each generating endpoint at said selected load level, the network testing traffic load on said network being distributed over and loading said network under selected network operating conditions; and collecting network testing traffic data, collected network testing traffic data indicating network congestion from generated network testing traffic, and network VoIP load capacity, call reception being selectively measured based on the network testing traffic load.

2. The method of claim 1, further comprising:
transmitting a plurality of requests to receive the network testing traffic to other endpoints; and
receiving network testing traffic by the other endpoints.

3. The method of claim 1, wherein the network testing traffic is used to determine busy hours call attempts (BHCA) and determine a desired network load in BHCA.

4. The method of claim 1, wherein the plurality of endpoints collect the network testing traffic data and the method further comprises determining network response to the selected VoIP load level and determining network VoIP message capacity.

5. The method of claim 1, further comprising:
transmitting an authentication key by the plurality of endpoints to a designated server; and
transmitting a response authentication key by the designated server to the plurality of endpoints.

6. The method of claim 1, further comprising transmitting the network testing traffic data to a server for network analysis to determine points of VoIP message congestion in the network and determine VoIP load capacity of the network.

7. The method of claim 1, wherein the network uses session initiated protocol (SIP) and said VoIP messages are SIP messages.

8. The method of claim 1, wherein the testing involves measuring the reception of calls received, measurement being at a server of the network and based on an amount of generated VoIP message traffic.

9. The method of claim 1, wherein the network comprises one or more servers, one or more internet protocol routers, and the plurality of endpoints.

10. The method of claim 1, wherein one or more of the endpoints switch to a testing mode when the request is received.

11. The method of claim 1, wherein one or more of the endpoints switch to an operating mode when the generated network testing traffic is complete.

12. The method of claim 1, wherein the network testing traffic includes session initiation protocol attempts.

13. An internet protocol (IP) network, comprising: a module for transmitting a plurality of requests to a plurality of endpoints distributed over a network to generate network testing traffic, said plurality of requests selecting a load level for the network, wherein the plurality of requests each specify one of the plurality of endpoints generating network testing traffic at a set frequency for a set period of time, said frequency being at least fifty per hour;

a module in each of said plurality of endpoints for generating Voice over Internet Protocol (VoIP) messages responsive to received said transmitted requests, generated VoIP messages from all of said plurality of endpoints loading the network at each respective endpoint, the network testing traffic being VoIP messages from all of said plurality of endpoints loading said network at said selected load level;

a module for collecting network testing traffic data indicating network congestion at said selected load level and network VoIP load capacity;

a module for transmitting a plurality of requests over said network to said plurality of endpoints to receive the network testing traffic from other endpoints; and a module in each of said plurality of endpoints for receiving network testing traffic by the other endpoints, call reception in said network being selectively measured based on the network testing traffic load.

14. The network of claim 13, further comprising:
a module for transmitting an authentication key by network endpoints to a designated server; and
a module for transmitting a response authentication key by the designated server to the network endpoints.

15. The network of claim 13, further comprising a module for transmitting the network testing traffic data to a server for network analysis, the server determining network response to VoIP message load and network VoIP message capacity.

16. The network of claim 13, wherein the network uses session initiated protocol (SIP) and said VoIP messages are SIP messages.

17. A system for testing a network, comprising:
a means for transmitting a plurality of requests to a plurality of endpoints distributed over a network to generate network testing traffic, said plurality of requests selecting a load level for the network, wherein the plurality of requests each specify one of the plurality of endpoints generating network testing traffic at a set frequency for a set period of time, said frequency being at least fifty per hour;

a means in each of said plurality of endpoints for generating Voice over Internet Protocol (VoIP) messages responsive to received said transmitted requests, generated VoIP messages from all of said plurality of endpoints loading the network at each respective endpoint, the network testing traffic being VoIP messages from all of said plurality of endpoints loading said network at said selected load level;

a means for collecting network testing traffic data indicating network congestion at said selected load level and indicating network VoIP load capacity;

a means for transmitting a plurality of requests over said network to said plurality of endpoints to receive the network testing traffic from other endpoints; and a means in each of said plurality of endpoints for receiving network testing traffic by the other endpoints, call reception in said network being selectively measured based on the network testing traffic load.

18. The system of claim 17, further comprising:
a means for transmitting an authentication key by the a plurality of endpoints to a designated server; and
a means for transmitting a response authentication key by the designated server to the a plurality of endpoints.

19. The system of claim 17, further comprising a means for transmitting the network testing traffic data to a server for network analysis, the server determining network response to VoIP message load and determining network VoIP message capacity.

* * * * *